(12) United States Patent
Jeong

(10) Patent No.: US 11,332,058 B2
(45) Date of Patent: May 17, 2022

(54) APPARATUS FOR ADJUSTING HEADREST WING

(71) Applicant: WOOBO TECH CO., LTD., Pyeongtaek-si (KR)

(72) Inventor: Hae Il Jeong, Incheon (KR)

(73) Assignee: Woobo Tech Co., Ltd., Pyeongtaek-si (KR)

( * ) Notice: Subject to any disclaimer, the term of this patent is extended or adjusted under 35 U.S.C. 154(b) by 0 days.

(21) Appl. No.: 16/496,525

(22) PCT Filed: Jun. 22, 2018

(86) PCT No.: PCT/KR2018/007091
§ 371 (c)(1),
(2) Date: Sep. 23, 2019

(87) PCT Pub. No.: WO2019/189999
PCT Pub. Date: Oct. 3, 2019

(65) Prior Publication Data
US 2020/0282890 A1 Sep. 10, 2020

(30) Foreign Application Priority Data
Mar. 27, 2018 (KR) .......................... 10-2018-0035053

(51) Int. Cl.
*B60N 2/885* (2018.01)
*B60N 2/806* (2018.01)
*E05D 11/08* (2006.01)
(52) U.S. Cl.
CPC ............. *B60N 2/885* (2018.02); *B60N 2/806* (2018.02); *E05D 11/08* (2013.01)

(58) Field of Classification Search
None
See application file for complete search history.

(56) References Cited

U.S. PATENT DOCUMENTS

| 3,752,286 A | * | 8/1973 | Sink ......................... F16D 13/48 464/169 |
| 4,433,765 A | * | 2/1984 | Rude ....................... F16D 7/022 192/81 C |
| 5,197,704 A | * | 3/1993 | Kitamura ................ F16M 11/10 16/305 |

(Continued)

FOREIGN PATENT DOCUMENTS

| FR | 2968342 A1 * | 6/2012 | ................ E05F 3/20 |
| JP | H0649934 Y2 | 12/1994 | |

(Continued)

OTHER PUBLICATIONS

Korean Intellectual Property Office, International Search Report and Written Opinion, Application No. PCT/KR2018/007091, dated Jan. 19, 2019, 9 pages.

(Continued)

*Primary Examiner* — David E Allred
(74) *Attorney, Agent, or Firm* — Sunstein LLP

(57) ABSTRACT

The present disclosure relates to an apparatus for adjusting a headrest wing, and more particularly, to an apparatus for adjusting a headrest wing in which a wire is used to make operating forces at the time of pushing and pulling a headrest wing to be different so that convenience is given to a user.

2 Claims, 7 Drawing Sheets

(56) References Cited

U.S. PATENT DOCUMENTS

| | | | | |
|---|---|---|---|---|
| 5,211,368 A | * | 5/1993 | Kitamura | G06F 1/1616 16/337 |
| 5,231,734 A | * | 8/1993 | Rude | E05D 11/084 16/342 |
| 5,566,424 A | * | 10/1996 | Crompton | G06F 1/1601 16/337 |
| 5,749,124 A | * | 5/1998 | Lu | G06F 1/1616 16/295 |
| 6,536,302 B1 | * | 3/2003 | Tame | B60N 2/933 74/543 |
| 6,899,311 B1 | * | 5/2005 | Ternus | F16M 11/10 248/454 |
| 6,974,010 B2 | * | 12/2005 | Machida | F16D 23/12 192/12 BA |
| 7,364,239 B2 | * | 4/2008 | Clough | A47C 7/38 297/391 |
| 7,404,234 B2 | * | 7/2008 | Lee | F16M 11/10 16/322 |
| 7,500,721 B2 | * | 3/2009 | Beroth | B60N 2/821 297/410 |
| 9,393,892 B1 | | 7/2016 | Millan | |
| 10,287,810 B2 | * | 5/2019 | Novin | E05D 3/02 |
| 10,407,957 B1 | * | 9/2019 | Camp | F16D 13/10 |
| 2002/0133907 A1 | * | 9/2002 | Oshima | F16C 11/10 16/321 |
| 2016/0068109 A1 | * | 3/2016 | Nakasone | B60N 2/78 296/37.12 |
| 2017/0356226 A1 | * | 12/2017 | Määttä | G06F 1/1618 |
| 2018/0319302 A1 | * | 11/2018 | Novin | F16C 29/02 |

FOREIGN PATENT DOCUMENTS

| | | |
|---|---|---|
| JP | H08164036 A | 6/1996 |
| JP | 2004-097452 A | 4/2004 |
| JP | 2008-272270 A | 11/2008 |
| KR | 10-0598597 B1 | 7/2006 |
| KR | 10-2007-0031490 | 3/2007 |
| KR | 10-2011-0002542 | 1/2011 |

OTHER PUBLICATIONS

Japanese Patent Office, Office Action, Application No. 2019-548007, dated Oct. 6, 2020, with English translation, 11 pages.

* cited by examiner

[Fig. 1]
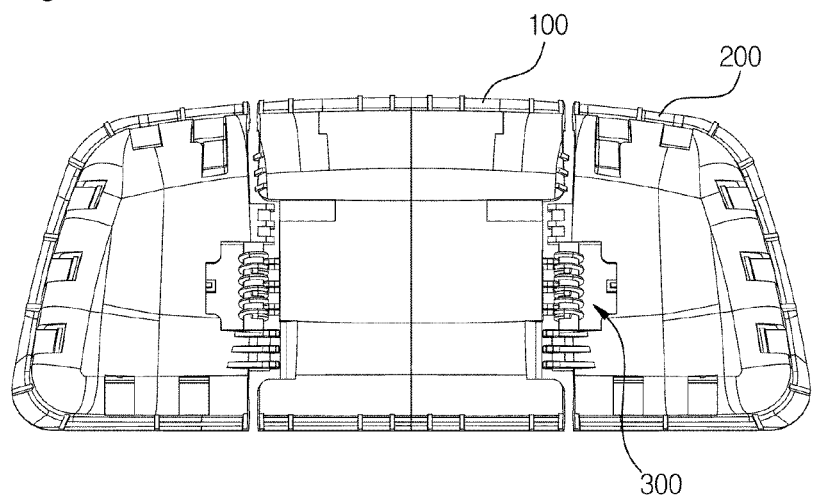
[Fig. 2]
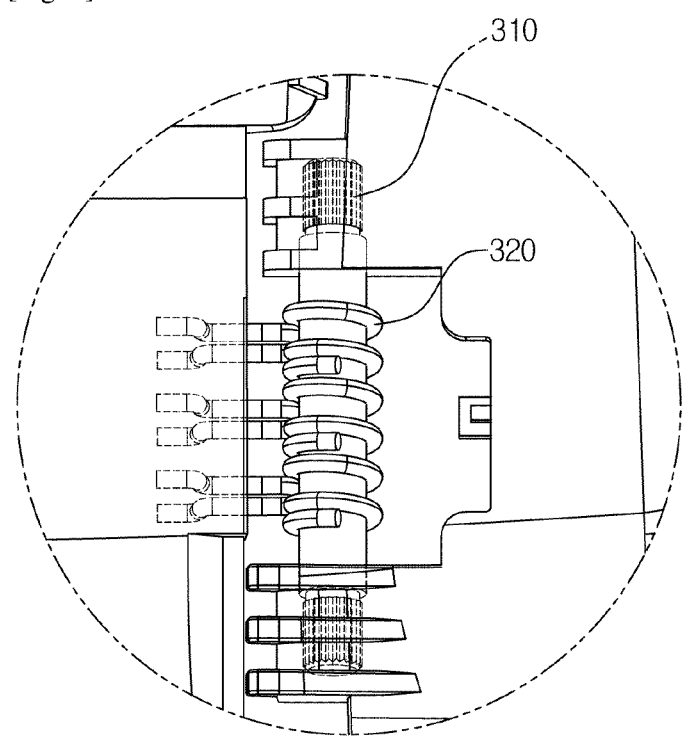

[Fig. 3]
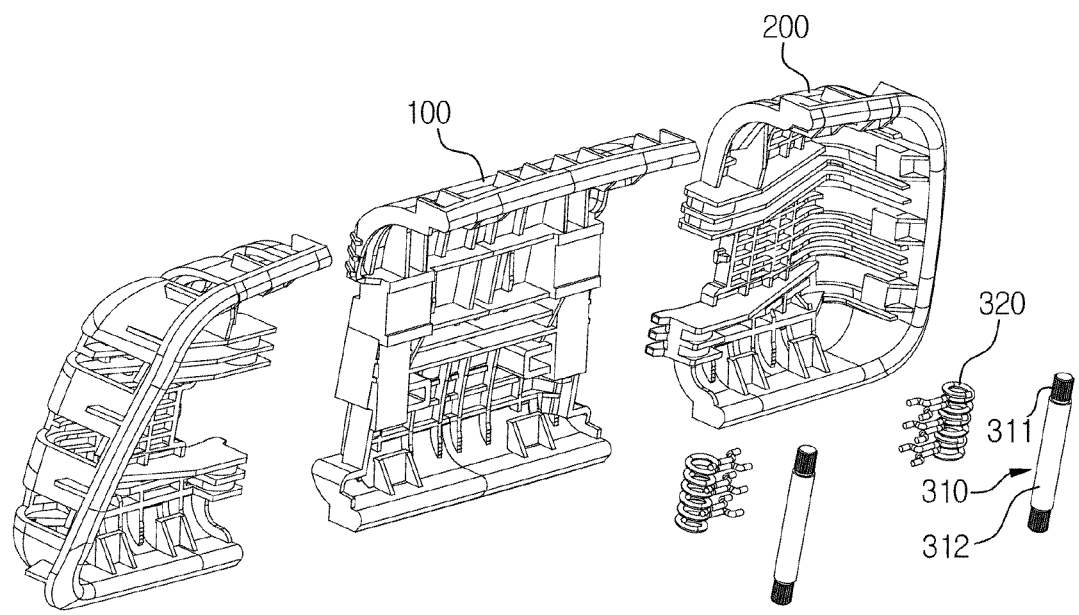
[Fig. 4]
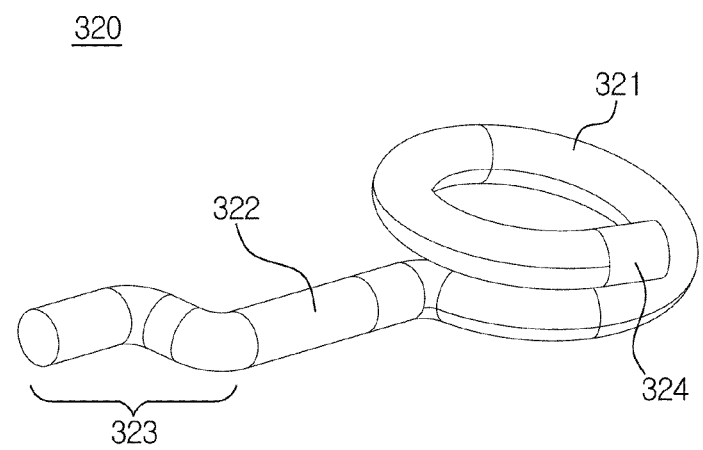

[Fig. 5]
320
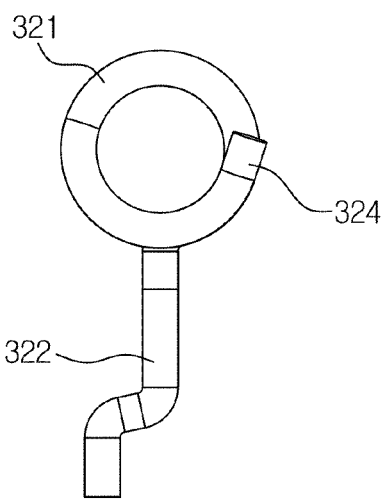
[Fig. 6]
320
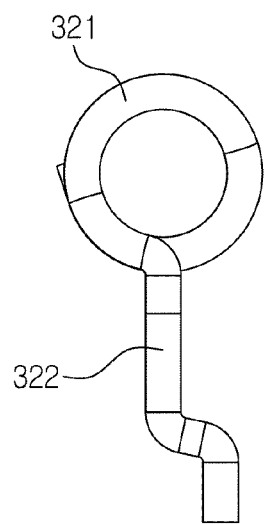

[Fig. 7]
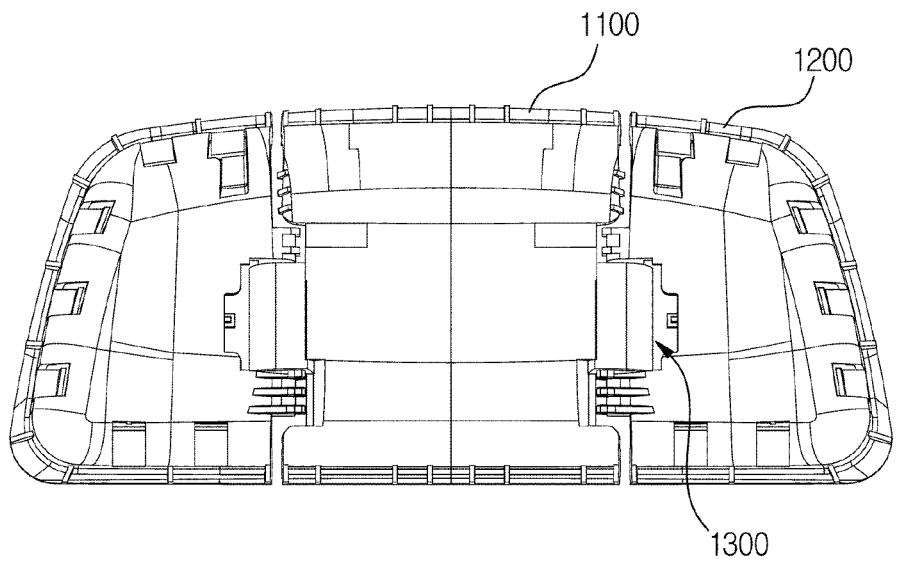
[Fig. 8]
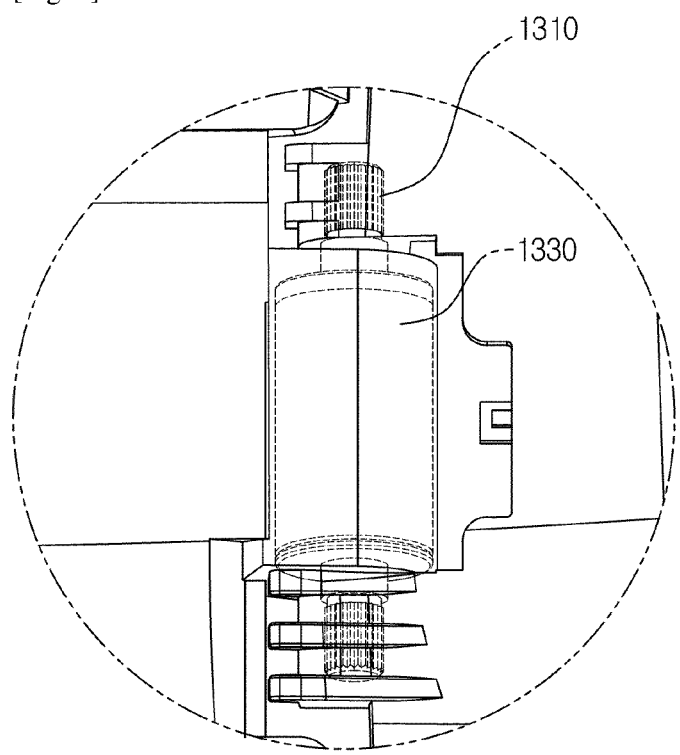

[Fig. 9]
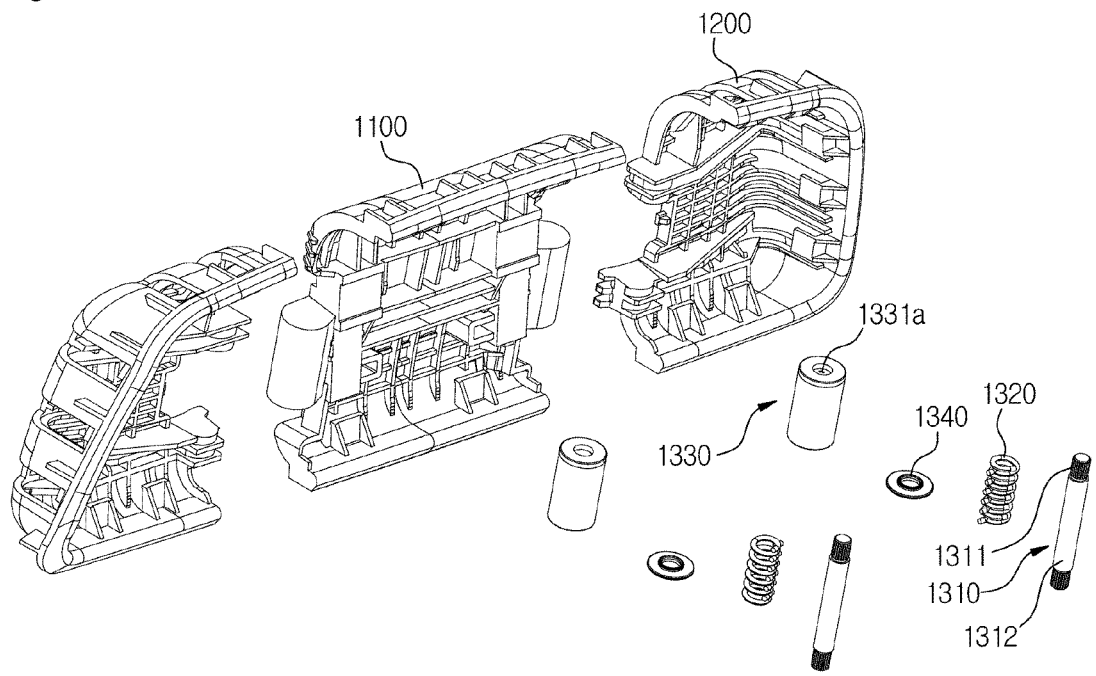
[Fig. 10]
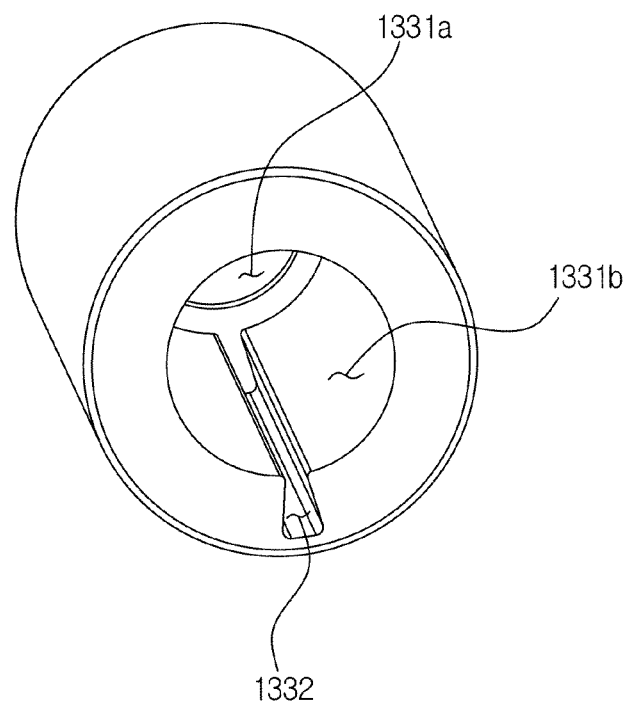

[Fig. 11]
1340
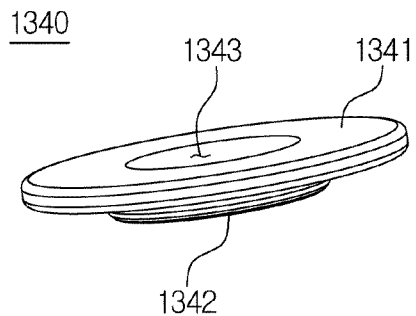
[Fig. 12]
1320
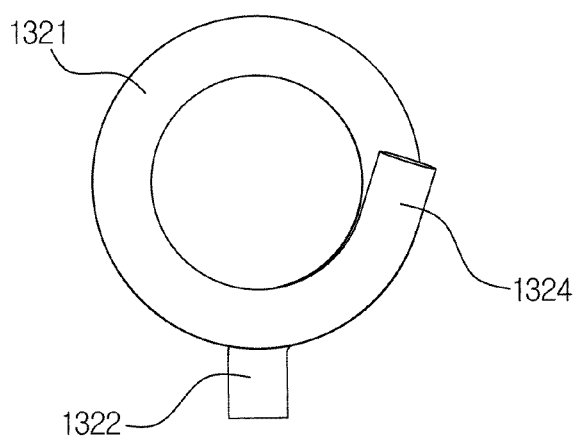
[Fig. 13]
1320
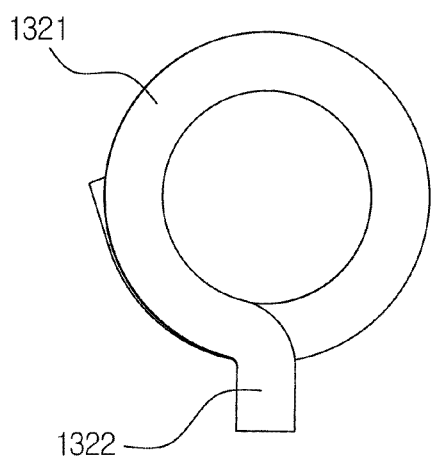

[Fig. 14]
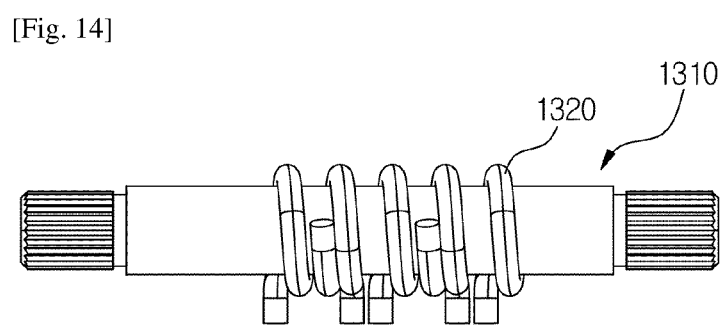

APPARATUS FOR ADJUSTING HEADREST WING

TECHNICAL FIELD

The present disclosure relates to an apparatus for adjusting an angle of a headrest wing.

BACKGROUND ART

Generally, a vehicle headrest is installed at an upper end of a backrest of a seat so that the vehicle headrest serves as a cushion that comfortably supports the head of an occupant at ordinary times and supports the head to prevent the head from suddenly falling back so as to prevent a neck injury or the like when an accident occurs.

Generally, a headrest wing indicates each of left and right parts of a headrest and provides a cushion to the left and right of the headrest so that the head of an occupant is supported in a stable manner.

The conventional headrests include a headrest in which an angle of a headrest wing is adjustable according to the convenience of an occupant.

However, the related art has problems in that, due to the difficulty in adjusting an operating force at the time of pulling or pushing a headrest wing, it is difficult to adjust an angle of the headrest wing according to occupants.

In Japanese Unexamined Patent Application, First Publication No. 2004-097452, a hinge which is formed by alternately overlapping a plurality of polymerized plates provided in the form of brackets is used for tilting of an armchair. Angles of a left part and a right part of a headrest are adjusted using friction between the plurality of polymerized plates.

The embodiment of Japanese Unexamined Patent Application, First Publication No. 2004-097452 has a problem in that, although an operating force at the time of pushing a headrest wing and an operating force at the time of pulling the headrest wing may be adjusted as a whole by adjusting the number of polymerized plates, it is not possible to separately adjust the operating forces.

In Korean Unexamined Patent Application Publication No. 10-2011-0002542, an elastic force of a torsion spring is used to adjust an angle of a wing plate. When the wing plate is rotated forward, an angle of the wing plate is fixed using a ratchet gear that is rotated along the wing plate and a stopper engaged with the ratchet gear, and when the wing plate is rotated forward to an end within a driving range, the wing plate returns to a state parallel to a center plate due to the elastic force of the torsion spring.

The embodiment of Korean Unexamined Patent Application Publication No. 10-2011-0002542 has problems in that it is difficult to adjust an operating force of a headrest wing, and when it is desired to re-adjust an angle of the headrest wing, the angle has to be re-adjusted from the beginning.

Also, sine a structure of a headrest requires the ratchet gear, the stopper, and the like, the number of components required is large, and thus it is difficult to manage the headrest.

PRIOR-ART DOCUMENTS

Patent Documents (Patent Document 1) Japanese Unexamined Patent Application, First Publication No. 2004-097452

(Patent Document 2) Korean Unexamined Patent Application Publication No. 10-2011-0002542

DISCLOSURE OF INVENTION

Technical Problem

The present disclosure has been devised to solve the above-described problems, and it is an object of the present disclosure to provide an apparatus for adjusting a headrest wing that is capable of easily adjusting an operating force for pushing and pulling the headrest wing and simplifying an assembly structure.

Solution to Problem

To achieve the above-described object, an apparatus for adjusting a headrest wing of the present disclosure includes a rotating rod having both ends connected to any one of a headrest wing and a headrest body, and a wire wound around the rotating rod, wherein an inner diameter of the wire is smaller than an outer diameter of the rotating rod before the wire and the rotating rod are assembled, one end of the wire is connected to the other one of the headrest wing and the headrest body, the other end of the wire is formed as a free end, a frictional force increases and an operating force of the headrest wing increases when a load is assigned to the one end of the wire in a direction in which the wire is wound, and the frictional force decreases and the operating force of the headrest wing decreases when a load is assigned to the one end of the wire in a direction in which the wire is unwound.

Alternatively, an apparatus for adjusting a headrest wing includes a rotating rod having both ends connected to any one of a headrest wing and a headrest body, and a case configured to surround the rotating rod and connected to the other one of the headrest wing and the headrest body, wherein the case includes a fixing groove therein, the apparatus includes a wire wound around the rotating rod, an inner diameter of the wire is smaller than an outer diameter of the rotating rod before the wire and the rotating rod are assembled, one end of the wire is inserted into the fixing groove, the other end of the wire is formed as a free end, a frictional force increases and an operating force of the headrest wing increases when a load is assigned to the one end of the wire in a direction in which the wire is wound, and the frictional force decreases and the operating force of the headrest wing decreases when a load is assigned to the one end of the wire in a direction in which the wire is unwound.

Alternatively, an apparatus for adjusting a headrest wing includes a rotating rod having both ends connected to any one of a headrest wing and a headrest body, and a plurality of wires wound around the rotating rod either clockwise or counterclockwise, wherein inner diameters of the wires are smaller than an outer diameter of the rotating rod before the wires and the rotating rod are assembled, one ends of the wires are connected to the other one of the headrest wing and the headrest body, the other ends of the wires are formed as free ends, a frictional force increases and an operating force of the headrest wing increases when a load is assigned to the one ends of the wires in a direction in which the wires are wound, the frictional force decreases and the operating force of the headrest wing decreases when a load is assigned to the one ends of the wires in a direction in which the wires are unwound, and an operating force at the time of pushing the headrest wing and an operating force at the time of pulling the headrest wing may be made different in accordance with a relative difference between the number of wires wound around the rotating rod clockwise and the number of wires wound around the rotating rod counterclockwise.

Alternatively, an apparatus for adjusting a headrest wing includes a rotating rod having both ends connected to any one of a headrest wing and a headrest body, and a case configured to surround the rotating rod and connected to the other one of the headrest wing and the headrest body, wherein the case includes a fixing groove therein, the apparatus includes a plurality of wires wound around the rotating rod either clockwise or counterclockwise, inner diameters of the wires are smaller than an outer diameter of the rotating rod before the wires and the rotating rod are assembled, one ends of the wires are inserted into the fixing groove, the other ends of the wires are formed as free ends, a frictional force increases and an operating force of the headrest wing increases when a load is assigned to the one ends of the wires in a direction in which the wires are wound, the frictional force decreases and the operating force of the headrest wing decreases when a load is assigned to the one ends of the wires in a direction in which the wires are unwound, and an operating force at the time of pushing the headrest wing and an operating force at the time of pulling the headrest wing may be made different in accordance with a relative difference between the number of wires wound around the rotating rod clockwise and the number of wires wound around the rotating rod counterclockwise.

The apparatus may further include a cap installed at a lower surface of the case.

Advantageous Effects of Invention

The above-described apparatus for adjusting a headrest wing of the present disclosure has the following advantageous effects.

Since a wire is formed to have an inner diameter smaller than an outer diameter of a rotating rod and then the wire and the rotating rod are assembled, a frictional force can be obtained using a simple method.

Since an operating force is adjusted using a frictional force between one or more wires and a rotating rod, a structure of the apparatus is simple, and the number of types of components to be managed is small Thus, it is easy to manufacture the apparatus.

By winding a wire one or more turns around a rotating rod, a pitch can be formed at the wire, and a frictional force can also be obtained in an axial direction between the wire and the rotating rod.

Since a wire is wound in one direction around a rotating rod, an operating force of a headrest wing at the time of a load is assigned in a direction in which the wire is wound and an operating force of the headrest wing at the time of a load is assigned in a direction in which the wire is unwound are different. Thus, operating forces at the time of pushing and pulling the headrest wing can be adjusted to be different according to the direction of the wire.

By adjusting the total number of wires wound around a rotating rod, an overall operating force of a headrest wing can be easily adjusted.

By using a plurality of wires, an operating force error can be reduced.

By winding a plurality of wires either clockwise or counterclockwise, operating forces at the time of pushing and pulling a headrest wing can be easily adjusted differently by the number of wires wound clockwise and the number of wires wound counterclockwise.

By adding a case configured to surround a rotating rod and a wire, a leakage of grease can be prevented, and an introduction of raw material can be prevented when assembling the apparatus with a headrest by insert injection.

By adding a cap that allows one surface of a case to be opened and closed, a rotating rod and a wire inside the case can be easily maintained and repaired.

BRIEF DESCRIPTION OF DRAWINGS

FIG. 1 is a front view of a headrest according to a first exemplary embodiment of the present disclosure.

FIG. 2 is a see-through view of a front portion of the headrest according to the first exemplary embodiment of the present disclosure.

FIG. 3 is an exploded perspective view of a rear surface of an apparatus for adjusting a headrest wing according to the first exemplary embodiment of the present disclosure.

FIG. 4 is a perspective view of a wire of the apparatus for adjusting a headrest wing according to the first exemplary embodiment of the present disclosure.

FIG. 5 is a front view of the wire of the apparatus for adjusting a headrest wing according to the first exemplary embodiment of the present disclosure.

FIG. 6 is a rear view of the wire of the apparatus for adjusting a headrest wing according to the first exemplary embodiment of the present disclosure.

FIG. 7 is a front view of a headrest according to a second exemplary embodiment of the present disclosure.

FIG. 8 is a see-through view of a front portion of the headrest according to the second exemplary embodiment of the present disclosure.

FIG. 9 is an exploded perspective view of a rear surface of an apparatus for adjusting a headrest wing according to the second exemplary embodiment of the present disclosure.

FIG. 10 is a perspective view of a case of the apparatus for adjusting a headrest wing according to the second exemplary embodiment of the present disclosure.

FIG. 11 is a perspective view of a cap of the apparatus for adjusting a headrest wing according to the second exemplary embodiment of the present disclosure.

FIG. 12 is a front view of a wire of the apparatus for adjusting a headrest wing according to the second exemplary embodiment of the present disclosure.

FIG. 13 is a rear view of the wire of the apparatus for adjusting a headrest wing according to the second exemplary embodiment of the present disclosure.

FIG. 14 is a front view of an apparatus for adjusting a headrest wing according to a third exemplary embodiment of the present disclosure.

MODE FOR THE INVENTION

Hereinafter, exemplary embodiments of the present disclosure will be described in detail with reference to the accompanying drawings.

For reference, for elements which are the same as those in the related art from among elements of the present disclosure which will be described below, the above-described related art will be referred to, and detailed description thereof will be omitted.

Technical terms used herein are merely for mentioning specific embodiments and are not intended to limit the present disclosure. A singular expression used herein includes a plurality expression unless clearly indicated otherwise in the context.

The term "include" used herein embodies a specific feature, region, integer, step, operation, element, and/or component, and does not preclude the existence or addition of another specific feature, region, integer, step, operation, element, component, and/or group.

The terms that indicate a relative space such as "below" and "above" may be used to more easily describe the relationship between one portion and another portion illustrated in the drawings. Such terms are intended to include another meaning or operation of an apparatus in use as well as a meaning intended in the drawings. For example, when an apparatus in the drawings is flipped, certain portions described as being placed "below" other portions may be placed "above" the other portions. Consequently, the illustrative term "below" includes both upward and downward directions. An apparatus may be rotated 90° or at another angle, and the terms indicating a relative space should be interpreted accordingly.

In exemplary embodiments of the present disclosure, front-rear refers to a front-rear direction (longitudinal direction) of a vehicle, top-bottom refers to a vertical direction of the vehicle, and left-right refers to a left-right direction (width direction) of the vehicle.

A headrest wing 200 may be formed at the left and right of a headrest body 100 as illustrated in FIG. 1, and may also be formed at an upper portion of the headrest body 100.

In the exemplary embodiments of the present disclosure, the case in which the headrest wing 200 is formed at the left and right of the headrest body 100 will be described.

First Embodiment

As illustrated in FIG. 1, an apparatus for adjusting a headrest wing according to a first embodiment includes a hinge part 300 configured to connect the headrest body 100 and the headrest wing 200.

As illustrated in FIGS. 2 and 3, the hinge part 300 includes a rotating rod 310 and a wire 320.

The rotating rod 310 includes a protrusion part 311 and a shaft 312.

The protrusion part 311 is formed at both ends of the shaft 312 and is connected to the headrest wing 200.

A plurality of protrusions that protrude long in a vertical direction to prevent sliding between the protrusion part 311 and the headrest wing 200 are formed at a circumference of the protrusion part 311.

The headrest wing 200 may maintain a specific angle due to the protrusion part 311.

One side of the wire 320 that is wound around the shaft 312 of the rotating rod 310 is connected to the headrest body 100.

Unlike the above description, the protrusion part 311 of the rotating rod 310 may be connected to the headrest body 100, and one side of the wire 320 wound around the shaft 312 of the rotating rod 310 may be connected to the headrest wing 200.

The headrest body 100, the headrest wing 200, and the hinge part 300 may be easily assembled using insert injection.

The wire 320 is illustrated in more detail in FIGS. 4, 5, and 6.

The wire 320 includes a winding part 321 configured to be wound around the shaft 312 of the rotating rod 310, a fixing part 322 connected to one end of the winding part 321, and a free end part 324 connected to the other end of the winding part 321.

The winding part 321 may be formed in the form of a coil, and an inner diameter of the coil may be formed to be smaller than an outer diameter of the shaft 312 of the rotating rod 310 so that the rotating rod 310 and the wire 320 are in close contact with each other after being assembled. Thus, a frictional force between the rotating rod 310 and the wire 320 may be effectively obtained.

The winding part 321 may be formed to be wound one or more turns around the shaft 312. In this case, a pitch is formed at the winding part 321 so that different winding parts 321 do not overlap. Thus, a frictional force in a circumferential direction and a frictional force in an axial direction may be simultaneously obtained between the rotating rod 310 and the wire 320.

The fixing part 322 is formed long outside the winding part 321 in a radial direction of the winding part 321.

One end of the fixing part 322 is connected to the winding part 321.

An engaging part 323 is formed at the other end of the fixing part 322.

The engaging part 323 is formed to be bent two times in the form of steps, and a frictional force is formed between the engaging part 323 and the headrest body 100 in a direction other than a direction toward the fixing part 322. Also, a device capable of engaging the engaging part 323 may be further included inside the headrest body 100. Thus, the wire 320 may be prevented from easily falling out from the headrest body 100.

Unlike the above description, the engaging part 323 may also be formed in a wavy pattern.

One end of the free end part 324 is connected to the winding part 321.

The free end part 324 is formed in a tangential direction of the winding part 321, and when the free end part 324 moves in a circumferential direction of the rotating rod 310, the other end of the free end part 324 is prevented from penetrating into the rotating rod 310.

An operating force of the headrest wing 200 in accordance with a direction of a load applied to the apparatus for adjusting a headrest wing will be described below.

The wire 320 which is wound counterclockwise from the fixing part 322 toward the free end part 324 as illustrated in FIG. 4 will be described as an example.

When the headrest wing 200 is rotated counterclockwise about the rotating rod 310, the rotating rod 310 is rotated counterclockwise due to a frictional force between the headrest wing 200 and the protrusion part 311 of the rotating rod 310.

When the rotating rod 310 is rotated counterclockwise, a force is applied counterclockwise, which is a direction in which the winding part 321 is wound, due to a frictional force between the shaft 312 of the rotating rod 310 and the winding part 321 of the wire 320, and the free end part 324 is moved counterclockwise in the circumferential direction of the rotating rod 310.

When the free end part 324 is moved counterclockwise in the circumferential direction of the rotating rod 310, a force of the winding part 321 tightening the shaft 312 is strengthened, and an operating force of the headrest wing 200 increases.

Conversely, when the headrest wing 200 is rotated clockwise about the rotating rod 310, the rotating rod 310 is rotated clockwise due to the frictional force between the headrest wing 200 and the protrusion part 311 of the rotating rod 310.

When the rotating rod 310 is rotated clockwise, a force is applied clockwise, which is a direction in which the winding part 321 is unwound, due to the frictional force between the shaft 312 of the rotating rod 310 and the winding part 321 of the wire 320, and the free end part 324 is moved clockwise in the circumferential direction of the rotating rod 310.

When the free end part 324 is moved clockwise in the circumferential direction of the rotating rod 310, the force of the winding part 321 tightening the shaft 312 is weakened, and the operating force of the headrest wing 200 decreases.

Unlike the above description, when the wire 320 which is wound clockwise is used, the operating force decreases when the headrest wing 200 is rotated counterclockwise, and the operating force increases when the headrest wing 200 is rotated clockwise.

Second Embodiment

As illustrated in FIG. 7, an apparatus for adjusting a headrest wing according to a second embodiment includes a hinge part 1300 configured to connect a headrest body 1100 and a headrest wing 1200.

As illustrated in FIGS. 8 and 9, the hinge part 1300 includes a case 1330, a rotating rod 1310, and a wire 1320.

The case 1330 is illustrated in more detail in FIG. 10.

The case 1330 is formed in a cylindrical shape.

The case 1330 is connected to the headrest body 1100.

The case 1330 includes a first rotating rod through-groove 1331a, a second rotating rod through-groove 1331b, and a fixing groove 1332.

The first rotating rod through-groove 1331a is formed to pass through an upper surface of the case 1330 in the vertical direction.

A diameter of the first rotating rod through-groove 1331a is similar to an outer diameter of a shaft 1312 of the rotating rod 1310.

Thus, the wire 1320 which is wound around the rotating rod 1310 may be prevented from falling out upward.

The second rotating rod through-groove 1331b is formed to pass through an inner portion and a lower surface of the case 1330 in the vertical direction.

A diameter of the second rotating rod through-groove 1331b is formed to be larger than the diameter of the first rotating rod through-groove 1331a.

The fixing groove 1332 is formed long in an inner wall of the case 1330 in the vertical direction.

The fixing groove 1332 is formed to have an open lower portion.

Thus, the wire 1320 may be assembled upward from a bottom of the case 1330.

The apparatus for adjusting a headrest wing may further include a cap 1340.

The cap 1340 is illustrated in more detail in FIG. 11.

The cap 1340 includes a bottom plate 1341, a protruding part 1342 formed at one surface of the bottom plate 1341, and a third rotating rod through-groove 1343.

An outer diameter of the bottom plate 1341 is similar to an outer diameter of the case 1330.

The protruding part 1342 is inserted into the second rotating rod through-groove 1331b of the case 1330.

An outer diameter of the protruding part 1342 may be formed smaller than a diameter of the second rotating rod through-groove 1331b.

The protruding part 1342 extends a contact surface between the cap 1340 and the rotating rod 1310 and prevents the cap 1340 from easily falling out.

The third rotating rod through-groove 1343 passes through the cap 1340 in an axial direction.

A diameter of the third rotating rod through-groove 1343 is similar to an outer diameter of the shaft 1312 of the rotating rod 1310.

The rotating rod 1310 includes a protrusion part 1311 and the shaft 1312.

The protrusion part 1311 is formed at both ends of the shaft 1312 and is connected to the headrest wing 1200.

A plurality of protrusions that protrude long in the vertical direction to prevent sliding between the protrusion part 1311 and the headrest wing 1200 are formed at a circumference of the protrusion part 1311.

The headrest wing 1200 may maintain a specific angle due to the protrusion part 1311.

One side of the wire 1320 that is wound around the shaft 1312 of the rotating rod 1310 is inserted into the fixing groove 1332 of the case 1330.

Unlike the above description, the protrusion part 1311 of the rotating rod 1310 may be connected to the headrest body 1100, and the case 1330 may be connected to the headrest wing 1200.

The headrest body 1100, the headrest wing 1200, and the hinge part 1300 may be easily assembled using insert injection.

The wire 1320 is illustrated in more detail in FIGS. 12 and 13.

The wire 1320 includes a winding part 1321 configured to be wound around the shaft 1312 of the rotating rod 1310, a fixing part 1322 connected to one end of the winding part 1321, and a free end part 1324 connected to the other end of the winding part 1321.

The winding part 1321 may be formed in the form of a coil, and an inner diameter of the coil may be formed to be smaller than the outer diameter of the shaft 1312 of the rotating rod 1310 so that the rotating rod 1310 and the wire 1320 are in close contact with each other after being assembled. Thus, a frictional force between the rotating rod 1310 and the wire 1320 may be effectively obtained.

The winding part 1321 may be formed to be wound one or more turns around the shaft 1312. In this case, a pitch is formed at the winding part 1321 so that different winding parts 1321 do not overlap. Thus, a frictional force in the circumferential direction and a frictional force in the axial direction may be simultaneously obtained between the rotating rod 1310 and the wire 1320.

The fixing part 1322 is formed outside the winding part 1321 in a radial direction of the winding part 1321.

One end of the fixing part 1322 is connected to the winding part 1321.

One end of the fixing part 1322 is inserted into the fixing groove 1332 of the case 1330.

One end of the free end part 1324 is connected to the winding part 1321.

The free end part 1324 is formed in a tangential direction of the winding part 1321, and when the free end part 1324 moves in a circumferential direction of the rotating rod 1310, the other end of the free end part 1324 is prevented from penetrating into the rotating rod 1310.

An operating force of the headrest wing 1200 in accordance with a direction of a load applied to the apparatus for adjusting a headrest wing will be described below.

The wire 1320 which is wound counterclockwise from the fixing part 1322 toward the free end part 1324 as illustrated in FIG. 12 will be described as an example.

When the headrest wing 1200 is rotated counterclockwise about the rotating rod 1310, the rotating rod 1310 is rotated counterclockwise due to a frictional force between the headrest wing 1200 and the protrusion part 1311 of the rotating rod 1310.

When the rotating rod 1310 is rotated counterclockwise, a force is applied counterclockwise, which is a direction in which the winding part 1321 is wound, due to a frictional force between the shaft 1312 of the rotating rod 1310 and the winding part 1321 of the wire 1320, and the free end part 1324 is moved counterclockwise in the circumferential direction of the rotating rod 1310.

When the free end part 1324 is moved counterclockwise in the circumferential direction of the rotating rod 1310, a force of the winding part 1321 tightening the shaft 1312 is strengthened, and the operating force of the headrest wing 1200 increases.

Conversely, when the headrest wing 1200 is rotated clockwise about the rotating rod 1310, the rotating rod 1310 is rotated clockwise due to the frictional force between the headrest wing 1200 and the protrusion part 1311 of the rotating rod 1310.

When the rotating rod 1310 is rotated clockwise, a force is applied clockwise, which is a direction in which the winding part 1321 is unwound, due to the frictional force between the shaft 1312 of the rotating rod 1310 and the winding part 1321 of the wire 1320, and the free end part 1324 is moved clockwise in the circumferential direction of the rotating rod 1310.

When the free end part 1324 is moved clockwise in the circumferential direction of the rotating rod 1310, the force of the winding part 1321 tightening the shaft 1312 is weakened, and the operating force of the headrest wing 1200 decreases.

Unlike the above description, when the wire 1320 which is wound clockwise is used, the operating force decreases when the headrest wing 1200 is rotated counterclockwise, and the operating force increases when the headrest wing 1200 is rotated clockwise.

Third Embodiment

Detailed description will be omitted for elements which are the same as those in the above-described first and second embodiments.

In a third embodiment, a method in which a plurality of wires 1320 are used to adjust an operating force of a headrest wing 1200 as illustrated in FIG. 14 will be described.

The third embodiment will be described on the basis of a headrest wing 1200 formed at the left of a headrest body 1100.

When an occupant pulls the headrest wing 1200 toward the head of the occupant, the headrest wing 1200 is rotated clockwise about a hinge part 1300, and when the occupant pushes the headrest wing 1200 against the head of the occupant, the headrest wing 1200 is rotated counterclockwise about the hinge part 1300.

The wires 1320 may be wound around a rotating rod 1310 either clockwise or counterclockwise.

The wires 1320 which are wound clockwise form an operating force at the time of pulling the headrest wing 1200 to be larger than an operating force at the time of pushing the headrest wing 1200.

The wires 1320 which are wound counterclockwise form the operating force at the time of pulling the headrest wing 1200 to be smaller than the operating force at the time of pushing the headrest wing 1200.

When the present disclosure is configured with three wires 1320 wound counterclockwise and two wires 1320 wound clockwise as illustrated in FIG. 14, the number of wires 1320 wound counterclockwise is larger than the number of wires 1320 wound clockwise.

Accordingly, while the overall operating force at the time of pulling and pushing the headrest wing 1200 is increased, the operating force at the time of pulling the headrest wing 1200 may be formed smaller than the operating force at the time of pushing the headrest wing 1200.

Unlike the above description, when the number of wires 1320 wound counterclockwise is smaller than the number of wires 1320 wound clockwise, the operating force at the time of pulling the headrest wing 1200 may be formed larger than the operating force at the time of pushing the headrest wing 1200.

Although the present disclosure has been described above with reference to the exemplary embodiments thereof, those of ordinary skill in the art should be able to modify or change the present disclosure in various ways within the scope not departing from the spirit and the range of the present disclosure indicated by the appended claims.

DESCRIPTION OF SYMBOLS

100: headrest body, 200: headrest wing
300: hinge part, 310: rotating rod
311: protrusion part, 312: shaft
320: wire, 321: winding part
322: fixing part, 323: locking part
324: free end part
1100: headrest body, 1200: headrest wing
1300: hinge part, 1310: rotating rod
1311: protrusion part, 1312: shaft
1320: wire, 1321: winding part
1322: fixing part, 1324: free end part
1330: case
1331*a*: first rotating rod through-groove
1331*b*: second rotating rod through-groove
1332: fixing groove, 1340: cap
1341: bottom plate, 1342: protruding part
1343: third rotating rod through-groove

The invention claimed is:

1. An apparatus for adjusting a headrest wing, the apparatus comprising:
a headrest body;
a headrest wing being configured to maintain a specific angle with respect to the headrest body;
a rotating rod having both ends connected to one of the headrest wing and the headrest body;
a case configured to surround the rotating rod and connected to the other one of the headrest wing and the headrest body, the case including:
a first rotating rod through-groove being formed at an upper surface of the case;
a second rotating rod through-groove being formed at a lower surface of the case;
a fixing groove, being formed on an inner wall of the case, being extended from the second rotating rod through-groove toward the first rotating rod through-groove; and
a plurality of wires, being wound around the rotating rod either clockwise or counterclockwise, being accommodated in the case,
wherein inner diameters of the wires are smaller than an outer diameter of the rotating rod before the wires and the rotating rod are assembled,
wherein the rotating rod is inserted through both the first and second rotating rod through-grooves, wherein a diameter of the second rotating rod through-groove is larger than a diameter of the first rotating rod through-groove, wherein the fixing groove is intersected with the second rotating rod through-groove, wherein each of the wires includes a winding part configured to be wound around the rotating rod, a fixing part connected to one end of the winding part, and a free end part connected to the other end of the winding part, wherein the winding part is formed to be wound between one and two turns around the rotating rod, wherein the fixing part is inserted into the fixing groove, wherein the free end part is formed as a free end, wherein a frictional force increases and an operating force of the headrest wing increases when a load is assigned to the fixing part in a direction in which the wires are wound, all wherein the frictional force decreases and the operating force of the headrest wing decreases when a load is assigned to the fixing part the one ends of the wires in a direction in which the wires are unwound, wherein an operating force at the time of pushing the headrest wing and an operating force at the time of pulling the headrest wing are made different in accordance with a relative difference between the number of wires wound around the rotating rod clockwise and the number of wires wound around the rotating rod counterclockwise.

2. The apparatus of claim 1, further comprising a cap installed at one surface of the case.

* * * * *